May 28, 1940.  R. E. BISHOP  2,202,617
METHOD OF SEALING CONDUITS
Filed Feb. 24, 1939
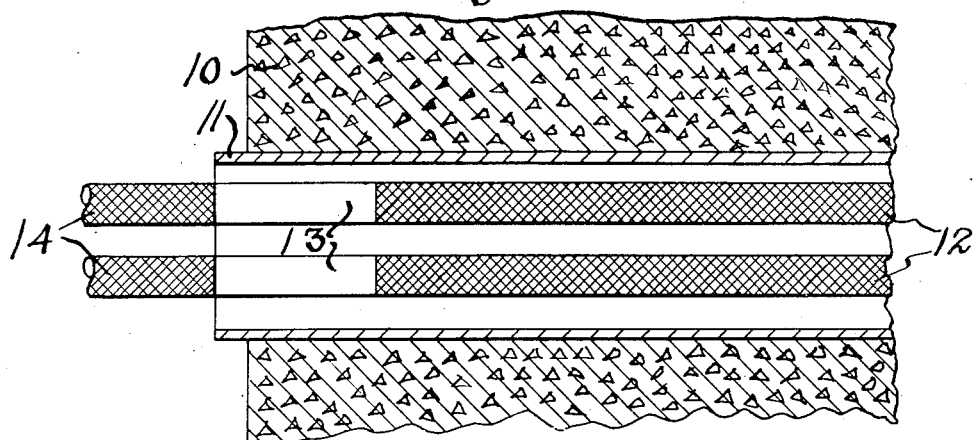
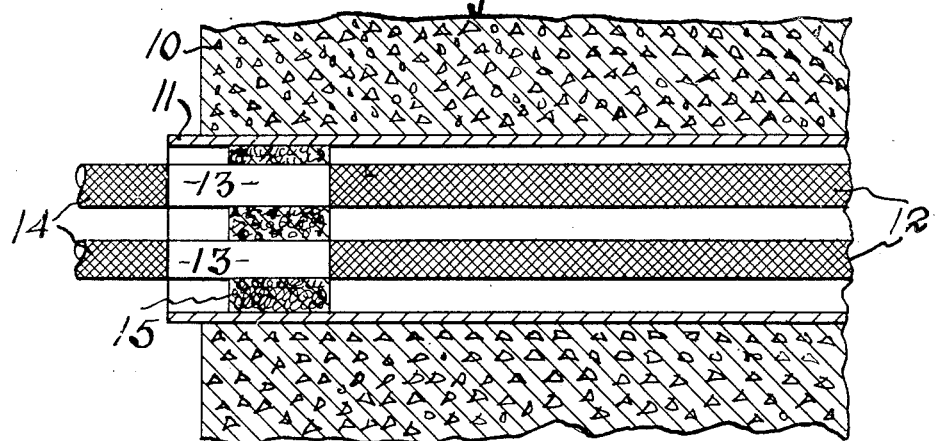
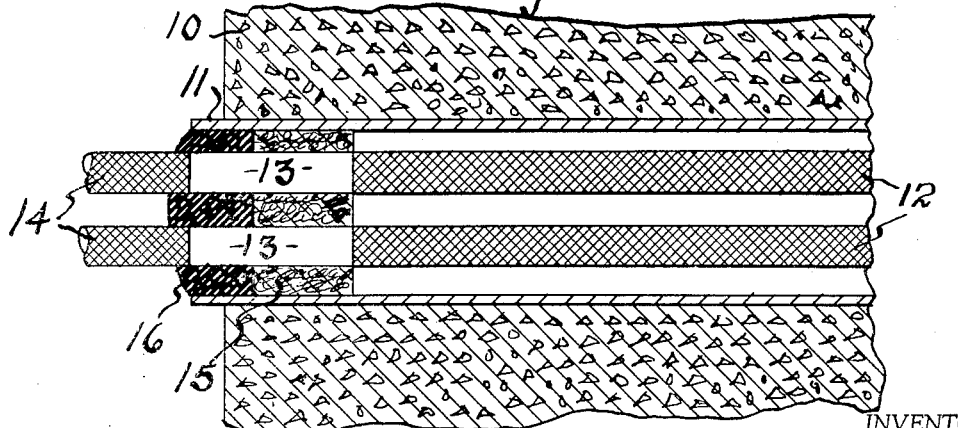
INVENTOR.
Richard E. Bishop.
BY
Danby & Danby
ATTORNEYS.

Patented May 28, 1940

2,202,617

UNITED STATES PATENT OFFICE 2,202,617

METHOD OF SEALING CONDUITS

Richard E. Bishop, South Orange, N. J., assignor to A. C. Horn & Company, Long Island City, N. Y., a corporation of New York Application February 24, 1939, Serial No. 258,207

5 Claims. (Cl. 174—77)

This invention relates to improvements in methods of sealing the ends of conduits through which electric cables and the like issue and the product resulting therefrom.

More specifically it is an object of this invention to provide a practical and relatively simple method of sealing the space in the ends of conduits and the like through which electric cables issue consisting in the procedure of forming a seal therein of a suitable rubber composition and loosely woven ropes or strands of fibrous material such as jute, hemp and the like.

It is among the objects of this invention to provide a seal for the end of a conduit through which electric cables issue employing a moldable plastic mass having a rubber base which is capable of setting or curing and which is conductive while plastic and insulating when set and which is then waterproof.

Another object subsidiary to that above is the attainment of a water-tight joint between the cables and the conduit wall and the rubber seal wherein in the case of rubber covered cables the set or cured mass is firmly bonded to the rubber insulation of the cables.

The other objects of this invention will be apparent from the following detailed description of one embodiment thereof.

This invention resides substantially in the combination, construction, arrangement, relative location of parts, steps and series of steps, as hereinafter disclosed.

This application is a continuation in part of my co-pending application Serial No. 179,377, filed December 11, 1937.

In the accompanying drawing:

Figure 1 is a vertical, longitudinal, central, cross-sectional view through a conduit and cable assembly to be sealed in accordance with this invention, illustrating the first step of the method.

Figure 2 is a similar view illustrating the second step thereof.

Figure 3 is a final view illustrating the completed product.

In accordance with this invention, the ends of conduits are sealed by using fibrous ropes and rubber compositions such as latex which when employed as hereinafter disclosed, provide a seal which strongly adheres to the defining boundaries of the seal and which are sufficiently pliant to maintain the seal under the various temperature and moisture conditions encountered in use.

Furthermore, the rubber ingredient of the joint is employed in such form that it may readily be prepared on the job and applied, after which it rapidly cures to form a permanent rugged seal. The incorporation of the fibrous rope with the rubber material has the advantage in addition to rendering the entire seal pliable, of absorbing the moisture from the rubber composition during the curing period, to facilitate a rapid cure. This absorption of moisture, however, is not so rapid as to so shorten the setting time that it will interfere with the preparation of a good seal. While a rubber plastic of this type is conductive while plastic, it becomes insulating when set, cured or vulcanized, and has the distinct ability of closely bonding to the rubber insulation of the cables and to the conduit walls when they have been primed. Where desired suitable vulcanizing agents, accelerators, and/or anti-oxidents, as well as inert filler materials, may be employed for their own purposes.

In accordance with this invention seals of this type may be rapidly made at relatively little expense. In some uses a suitable rubber solvent may be employed as a carrier for the rubber ingredient upon the evaporation of which a practical seal is secured.

Referring to the drawing, there is illustrated at 10 a wall through which the conduit 11 issues, which wall may be the foundation of a building, the wall of a transformer vault, or the like. In the case where the conduits 11 for example extend from a transformer vault in the street to the basement of an adjoining building, it is common practice to pitch the pipe toward the building so that moisture will not collect therein.

Under these conditions should the transformer vault accumulate water up to the level of the conduit, it would run therefrom into the building. For this reason among others, it is desirable to seal the conduit in the spaces around the cables which lie therein. These cables have been illustrated by the reference numeral 14 in the drawing as of the known leaded service cable type having a weatherproof braid covering as illustrated.

Heretofore the conduits of this type have been sealed with putty but this is unsatisfactory because it tends to crack and break away, especially since the workmen often stand or sit on the exposed cables while working. Various latex compounds have been tried but it frequently happens that they are washed away or destroyed before they are properly set. In any event in the forms commonly used it is hard to seal the conduits because of their tendency to flow before they set.

In accordance with this invention a portion of the fabric covering of the cables is removed, as well as the rubber tape which is commonly used on them as indicated at 13. This will leave exposed the rubber covered conductors which forms a good base for the seal as will become apparent later.

A mass of loosely woven fibrous rope is then packed in the end of the conduit around the conductors, as is clear from Figure 2. A very suitable fibrous rope for this purpose is loosely woven jute, hemp, oakum, or the like.

The next step is to then dip a loosely woven strand of jute or hemp in latex or a rubber solution of the type referred to above so as to be thoroughly coated with a thin layer thereof. The fibrous strand thus coated is then packed in around the conductors, to fill up the remainder of the end of the conduit as illustrated at 16 in Figure 3.

When desired the interior wall of the conduit in the area to be sealed may be first primed with a suitable latex or rubber solution or composition to form a surface against which the rubber coated packing may firmly bond. In those cases where the conductors after preparation as indicated in Figure 1 still have a rubber covering on them, it will be seen that the rubber coated strands will also form an intimate bond therewith.

The tightly packed rubber strands, as the rubber cures, weld or mold into a unitary mass which forms a moistureproof plug completely sealing the end of the tube. Thus although the plug is conductive while plastic, it becomes highly insulating when it has set or cured. This plug, however, is sufficiently flexible and resilient so as to withstand the various strains to which it is subjected because of temperature changes and the like, without opening up to form cracks through which moisture may pass. It will be seen that the strands carrying the rubber coating are sufficiently self-supporting while the rubber is curing so as not to work out of the joint. The curing proceeds rapidly because of the absorption of moisture by the strand, but slowly enough so that the work can be readily accomplished without rushing.

A suitable latex concentrate for this purpose is one consisting of approximately 60% solid content mixed with a suitable cement such as aluminous cement in a ratio of one to one by weight. As pointed out above, this mixture may include forms such as equalizers, accelerators, and/or anti-oxidants, all of which are known in the art in various forms. Instead of a latex composition of this type rubber cut with a suitable organic or inorganic solvent may be employed, a number of which are well known in the art.

From the above description it will be apparent to those skilled in the art that modification in the details of the invention may be employed without departure from the novel subject matter herein set forth. I do not, therefore, desire to be strictly limited by the disclosure but rather by the claims granted me.

What is claimed is:

1. A method of sealing the end of a conduit, comprising the steps of forming a fibrous plug in and back of the end of the conduit, dipping loosely woven strands of a fibrous material in a liquid rubber composition capable of setting, and filling the space between the plug and the adjacent end of the conduit with the dipped strands while the composition thereon is liquid to seal the end of the conduit.

2. A method of sealing the end of a conduit, comprising the steps of forming a fibrous plug in and back of the end of the conduit, dipping loosely woven strands of a fibrous material in a liquid latex composition capable of setting, and filling the space between the plug and the adjacent end of the conduit with the dipped strands while the composition thereon is liquid to seal the end of the conduit.

3. The method of sealing the end of a conduit through which one or more electric cables project, which comprises packing a body of fibrous material in the conduit around the cables in back of the end of the conduit, dipping a loosely woven fibrous rope in a liquid rubber mixture capable of setting, priming the inner wall of the end of the conduit with a liquid rubber mixture, and packing the rope while its coating is still liquid in the end of the conduit and around the cables to seal the end of the conduit.

4. A method of sealing the end of a conduit through which one or more insulated cables having rubber and fabric layers project, which comprises removing the cable fabric layer to expose the rubber layer, packing a mass of fibrous material in the conduit around the cables, and sealing the end of the conduit with fibrous strands coated with a liquid rubber mixture while the rubber mixture on the strands is still liquid, whereby the coated strands are bonded to the exposed rubber layers of the cables.

5. A method of sealing the end of a conduit from which issues at least one insulated cable having rubber and fabric insulating layers, which comprises removing the fabric layer from the cable adjacent the end of the conduit to expose the rubber layer, forming a plug of fibrous material in the conduit around the cable, priming the inner wall of the conduit at the end, and sealing the end of the conduit by packing therein a loosely woven strand coated with a liquid rubber composition while the composition is still liquid, the coating being capable of setting, and the packing being bonded to the rubber covering of the cable when the coating sets.

RICHARD E. BISHOP.